(No Model.)
W. K. FREEMAN.
SECONDARY ELECTRIC BATTERY.
No. 270,778. Patented Jan. 16, 1883.
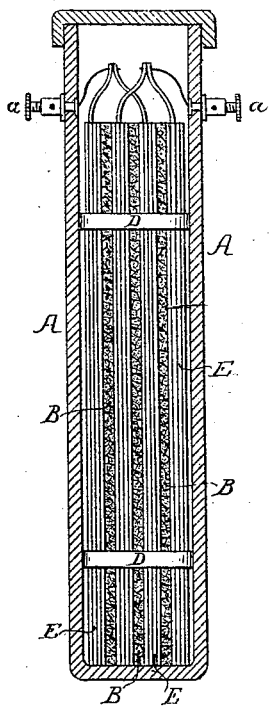
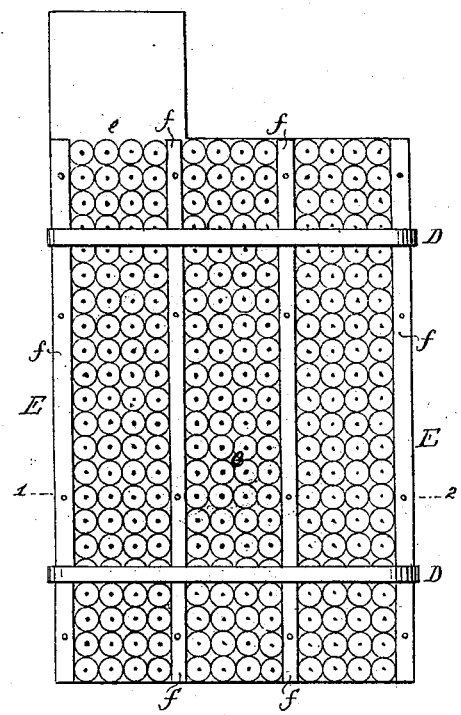
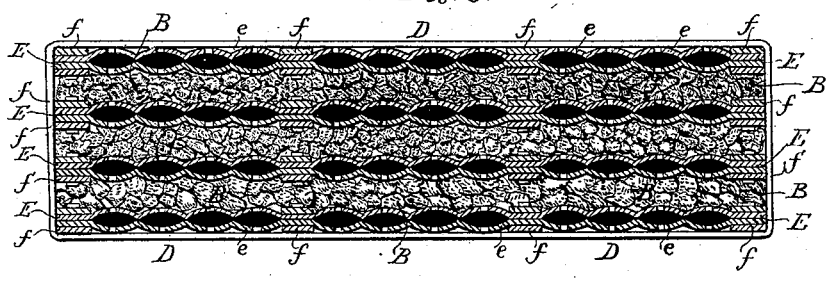
WITNESSES:
David S. Williams
Harry Drury
INVENTOR
Walter K. Freeman
by his attorneys
Howsen and Sons

UNITED STATES PATENT OFFICE.

WALTER K. FREEMAN, OF BROOKLYN, NEW YORK, ASSIGNOR TO W. F. JOBBINS, OF EAST ORANGE, NEW JERSEY.

SECONDARY ELECTRIC BATTERY.

SPECIFICATION forming part of Letters Patent No. 270,778, dated January 16, 1883.

Application filed June 15, 1882. (No model.)

*To all whom it may concern:*

Be it known that I, WALTER K. FREEMAN, a citizen of the United States, and a resident of Brooklyn, New York, have invented certain Improvements in Secondary Electric Batteries, of which the following is a specification.

My invention consists of certain improvements, more fully described hereinafter, in the construction of secondary electric batteries based on the well-known Planté secondary batteries, which are rendered active by first passing an electric current through them.

In the accompanying drawings, Figure 1 is a vertical section of a secondary battery constructed according to my invention; Fig. 2, a side view of the electrodes; and Fig. 3, an enlarged transverse section on the line 1 2, Fig. 2.

In Fig. 1 I have shown a battery having four electrodes, E, inclosed in a case, A, containing the dilute sulphuric acid or other suitable electrolytic fluid, the electrodes being shown as connected up in pairs to suitable binding-posts, $a$. I separate the electrodes one from another by interposing a porous layer, B, preferably of sponge, and I preferably bind the electrodes and intermediate porous layers together by means of bands D, of rubber, cord, or similar material. Each electrode E is constructed, as shown in Figs. 2 and 3, of two sheets, $e$ $e$, of lead, in each of which is formed a series of circular concave recesses by dishing the sheet of lead, and the center of each circular dish or recess is perforated, as seen in Fig. 3. When the two dished plates are placed face to face with corresponding cavities opposite each other, there are formed a series of circular pockets, in which is placed the oxide of lead or equivalent insoluble material. The plates, with the intervening oxide, are secured together by means of leaden rivets passed through the plates and strips $f$ $f$. By thus constructing the electrodes with a series of separate pockets for the reception of the insoluble material they do not polarize so rapidly as do the electrodes with flat, corrugated, or similar plates, in which the oxide extends in uninterrupted strips or layers from top to bottom of the electrodes, for in such case the polarization, when it once sets in, spreads rapidly upward through the material. By having the material in separate pockets the polarization is prevented from spreading.

The battery is "formed" by passing through it a current from an active battery or dynamo-electric machine in the usual manner.

It will be understood that although I have shown in the drawings a battery with only four electrodes, their number and size may be varied indefinitely.

I claim as my invention—

1. An electrode for secondary batteries, composed of two lead plates secured together, and each having a series of circular concave and perforated recesses, forming together circular pockets for the insoluble oxide or similar material, substantially as described.

2. An electrode for secondary batteries, composed of two lead plates secured together by lead rivets and strips, and each having a series of circular concave and perforated recesses containing the insoluble oxide or similar material, substantially as set forth.

3. A secondary battery provided with electrodes consisting of lead plates secured together, and having circular dished and perforated recesses between them containing the insoluble oxide or similar material, and layers of porous material between the electrodes.

In testimony whereof I have signed my name to this specification in the presence of two subscribing witnesses.

WALTER K. FREEMAN.

Witnesses:
 JOHN H. KATTENSTROTH,
 HUBERT HOWSON.